Jan. 2, 1945.  E. BAGNALL  2,366,472
STABILIZER
Filed Dec. 5, 1941  2 Sheets-Sheet 1
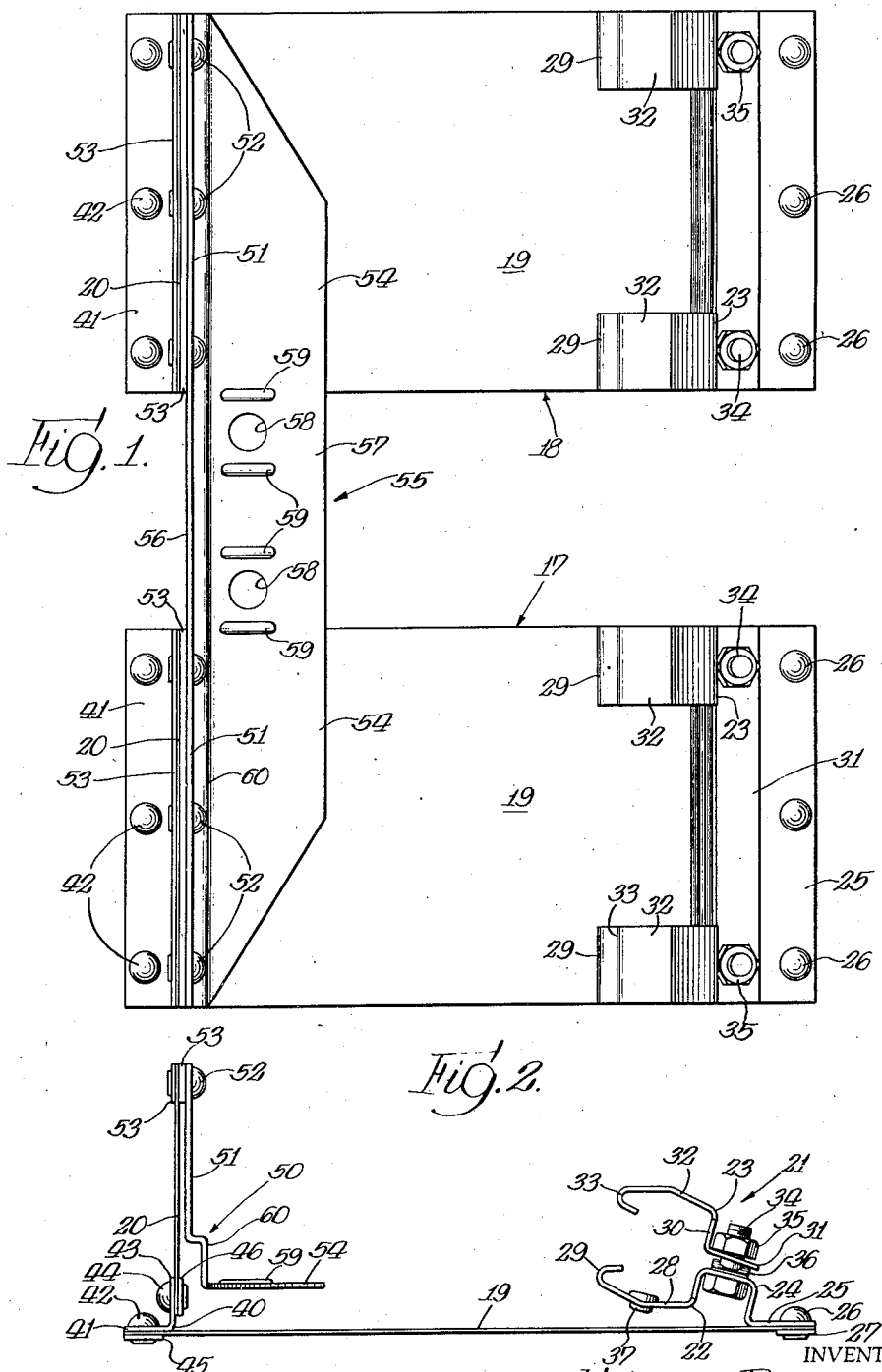
INVENTOR.
Edwin Bagnall,
BY Ernest A. Wegner his Atty.

Jan. 2, 1945. E. BAGNALL 2,366,472
STABILIZER
Filed Dec. 5, 1941 2 Sheets-Sheet 2
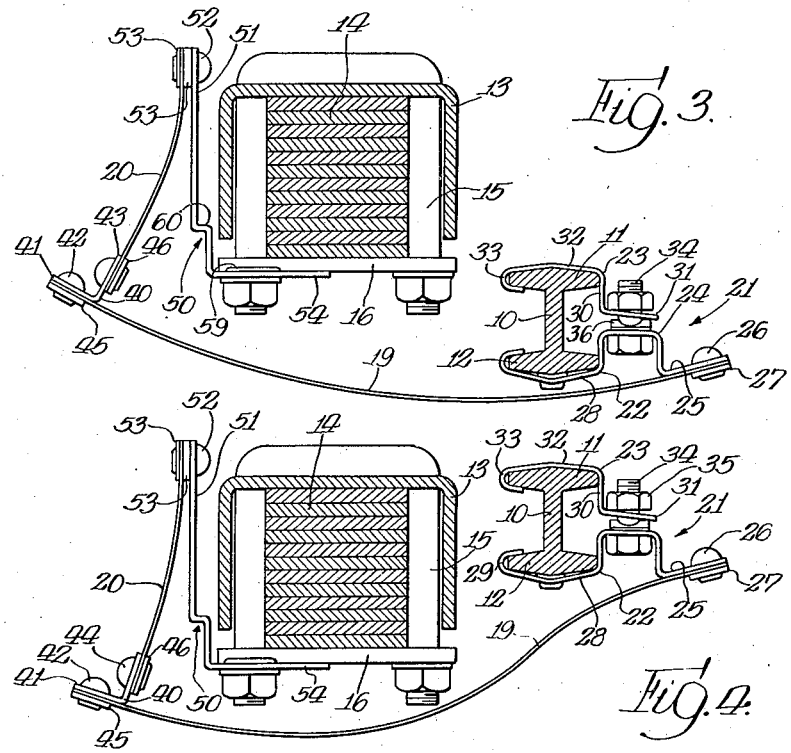
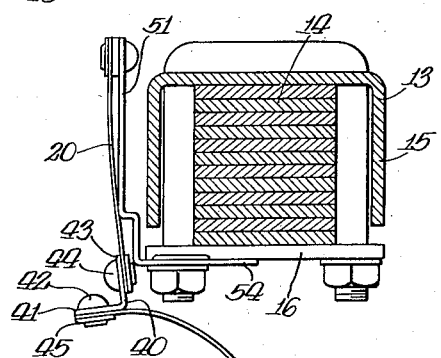
INVENTOR.
Edwin Bagnall
BY Ernest A. Hegner, Atty.

Patented Jan. 2, 1945

2,366,472

UNITED STATES PATENT OFFICE 2,366,472

STABILIZER

Edwin Bagnall, Chicago, Ill.

Application December 5, 1941, Serial No. 421,768

18 Claims. (Cl. 267—67)

The invention relates generally to a stabilizer structure for a spring-supported body, and more particularly to a stabilizer for vehicles, being generally of the type disclosed and claimed in my copending application Serial No. 364,509, filed November 6, 1940.

One object of the invention is to provide a new and improved stabilizer structure offering increased resistance to movements to be prevented by the stabilizer structure without materially decreasing the flexibility of the stabilizer structure in the direction of permissible relative movements between the spring supported body and its support.

Another object is to provide dual or duplex stabilization with a common attaching means for one end of the units making up the stabilizer structure.

Another object is to provide, in a stabilizer structure having a single point of attachment to a spring supported body, a new and improved construction for resisting roll of the body.

Other objects and advantages will become apparent from the following detailed description taken in connection with the accompanying drawings, in which:

Fig. 1 is a top plan view of a stabilizer structure embodying the features of this invention.

Fig. 2 is a side elevational view of the stabilizer structure of Fig. 1, shown as in Fig. 1, in its unapplied condition.

Fig. 3 is a side elevational view of the stabilizer structure of Figs. 1 and 2 applied to a vehicle and shown with the spring of the vehicle in normal or static position.

Fig. 4 is a view similar to Fig. 3 but with the spring in fully flexed position under full load.

Fig. 5 is a view similar to Fig. 3 but with the spring in fully recoiled position.

As above stated generally, the stabilizer of this invention is applicable to a variety of spring supported bodies, but finds its primary application to vehicles of all kinds having bodies spring supported on an undercarriage structure. The problem of lateral stabilization of such vehicles and the added difficulties introduced by the employment of soft springs are generally the same, though the type of spring suspension and the body or undercarriage structure may vary in detail. Necessarily disclosure of the stabilizer must be made in some particular environment and will so be made hereinafter. It is not intended, however, that the invention is to be limited to the specific construction disclosed, nor even to use on a vehicle. On the contrary it is intended to cover all uses or adaptations and all modifications or alternative constructions falling within the scope or spirit of the invention as defined in the appended claims.

For exemplary purposes, the stabilizer structure is herein disclosed as applied to a vehicle the undercarriage of which includes an axle 10 which is of I-beam shape in cross section, providing upper and lower flanges 11 and 12. The body or chassis frame structure includes a transverse member 13 spaced longitudinally of the vehicle with respect to the axle 10, and in the normal or static position of the chassis frame structure is disposed slightly above the axle 10, all as best seen in Fig. 3. In certain automotive vehicles, for example, the Fords, Mercuries, and so forth, the member 13 is channel shaped and is utilized as a partial housing for a transverse spring 14 which is secured to and within the member by U-bolts 15 and a conventional clip bar 16. The stabilizer will hereinafter be described as applied to this general kind of undercarriage and chassis frame structure.

The stabilizer structure is of dual or duplex construction comprising a pair of stabilizers, generally designated 17 and 18, arranged side by side, as best seen in Fig. 1. The stabilizers are of identical construction with each generally similar to the stabilizer disclosed and claimed in my copending application Serial No. 416,946, filed October 29, 1941, now Patent No. 2,340,858, issued February 8, 1944. Each stabilizer comprises a pair of leaf or sheet-like elements 19 and 20 rigidly interconnected at one of their ends and intended to be rigidly attached at the remaining ends one to the undercarriage and the other to the chassis frame structure. The elements 19 and 20 are of a high quality, resilient metal, preferably spring steel, and each is made relatively thin so as to be made readily flexible in a direction normal to its plane. At the same time, each element is made comparatively wide so as to offer tremendous resistance to the bending moments in the plane of the element. By way of example, the thickness of the elements may be in the order of one thirty-second of an inch, while the width of the elements herein shown is in the order of six inches.

The elements are, as stated, rigidly interconnected and rigidly attached, flexibility in a certain direction and a free point being designed into the stabilizer to make such rigid interconnection and attachment possible. The elements are, moreover, disposed with their width extending transversely of the vehicle, that is, flatwise rather than edgewise, and the stabilizer as a whole extending longitudinally so that, as interconnected and applied, the stabilizer is effective to prevent relative movement between the body and undercarriage in a direction transversely of the vehicle as more particularly disclosed and explained in my above mentioned copending application Serial No. 364,509.

When applied, the stabilizer as a whole extends longitudinally of the vehicle with one of the elements attached to the undercarriage structure. Herein the element 19 is constructed for such attachment. To facilitate attachment of the stabilizer either as an accessory or as standard equipment, the attaching means is designed to take advantage of and cooperate with the structures as normally found in the vehicles. Accordingly, the element 19 is adapted for attachment to the axle 10 and to that end has rigidly secured to the end thereof an attaching means, generally designated 21. The element 19 and the attaching means 21 are so constructed as to obtain, among other purposes, ample clearance for the ends of the U-bolts 15, particularly upon deflection of the spring 14 under load.

To that end, the element 19 is made of such length that it extends underneath and rearwardly beyond the axle 10 with the means 21 then extending forwardly to grip the axle 10. The means 21 comprises a double jawed clamp, one jaw 22 of which is secured to the end of the element 19, and the other jaw 23 of which is carried adjustably and removably on the first jaw. The jaw 22 is formed by a plate of the width of the element 19 having a main portion 24 which is approximately U-shaped in cross section, and a flange portion 25, by means of which the jaw is attached to the element 19. A plurality of rivets 26 passing through the flange portion 25 secure the jaw 22 rigidly to the element 19, a reinforcing strip 27 being applied to the face of the element 19 opposite the flange 25 to provide a frictional connection assuming part of the shear load which would otherwise have to be borne by the rivets alone. Extending in the opposite direction from the U-shaped main portion 24 are a pair of fingers 28, each terminating in a hook 29 for engagement with the forward edge of the bottom flange 12 of the axle 10, as clearly seen in Figs. 3 to 5. As best seen in Fig. 2, the jaw 22 does not extend exactly parallel with the element 19, but makes a small angle therewith.

Jaw 23 is in the main composed of an angle plate 30 having a flange portion 31 extending in one direction and a pair of fingers 32 extending in the opposite direction, and each terminating in a hook 33 adapted for engagement over the forward edge of the top flange 11 of the axle 10, as clearly seen in Figs. 3 to 5. Each the base of the U-shaped main portion 24 of the jaw 22 and the flange 31 of the jaw 23 is formed with registering holes through which bolts 34 project, and by means of which and the nut 35 carried thereby the jaws are drawn into tight clamping relationship with respect to the axle 10. In order that this clamping of the axle by the jaws may be as rigid as possible and wholly free of play, each of the fingers 28 and 32 is, as best seen in Fig. 2, provided with a slight bend intermediate its ends so as to conform to the sloping surfaces of the flanges 11 and 12 of the axle 10. In this connection, the angle between the angle plate 30 and its flange 31 is not precisely a right angle but slightly greater than a right angle, so that when the jaws are drawn together the flange 31 will form less than a right angle with the bolts 34 and thus serve to lock the nuts 35 and obviate the necessity of lock washers. To facilitate the attachment of the stabilizer, there is applied to each bolt 34 a speed nut or washer 36 which serves to retain the bolts 34 in the jaw 22 the same as if they were studs rigid with the jaw.

As previously stated, the stabilizer is so constructed as to provide ample clearance for the spring 14 and particularly the projecting lower ends of the U-bolts 15 under all conditions of operation including extreme flexing of the spring 14. To that end also, as previously stated, the jaw 22 does not extend strictly parallel with the element 19 but in the normal or unapplied condition of the stabilizer projects at a slight angle to the element. It is believed apparent that when the stabilizer is applied to the axle the attaching means will of necessity assume a substantially horizontal position with the result that the flange 25 will now be disposed at a slight angle with respect to the horizontal, as best seen in Figs. 3 to 5, and will thus tend to cause the element 19 to extend forwardly and slightly downwardly. In order to enhance this flexing effect of the flange 25, the flange is made wider than would be necessary merely to accommodate the rivets 26, and is then riveted near its free edge, thereby lengthening the moment arm tending to effect the flexing of the element 19. For a purpose later more apparent, each of the jaws 28 is provided with a rubber nub 37 right at the bend in the jaws.

As more fully pointed out in my application on a stabilizer, Serial No. 416,946, filed October 29, 1941, the employment of soft springs on automotive vehicles provides many obstacles to be overcome in the design of a suitable stabilizer. Also contributing to the problem is the trend in design toward a constantly lower center of gravity of the vehicle, necessitating a constantly lower position of the spring. Thus, as seen in Fig. 3, the lower portion of the spring, even in the normal position thereof, is substantially at the level of the top of axle 10. Under full load, the spring is deflected to the position shown in Fig. 4, whence it extends well below the axle 10. With deflection of the spring to the point shown in Fig. 4, the stabilizer must be given a unique design in order that it may not further materially reduce the road clearance. Accordingly, each stabilizer herein incorporates the construction disclosed and claimed in my above mentioned application Serial No. 416,946, wherein, under full deflection of the spring, the stabilizer will not materially reduce road clearance, yet on recoil of the spring there are no excessive stresses created either in the stabilizer or the parts to which it is attached.

In such a construction, the element 20 is disposed transversely of and generally normal to the element 19. As here best seen in Fig. 2, the element 20, in the unapplied condition of the stabilizer, is directly normal to the element 19 but such precise right angular relationship is not critical. The element 20 remains generally normal to the element 19 in the normal applied condition of the stabilizer (Fig. 3) and even in the loaded and recoiled position (see Figs. 4 and 5), though in those positions the element 19 is flexed to a substantial degree. While the elements 19 and 20 might be formed from a single piece bent at right angles, they preferably are separate pieces secured together in this right angular or normal relationship by means of an angle iron or bar 40 having a first flange 41 secured by rivets 42 to the end of the element 19 and a second flange 43 secured by rivets 44 to the lower end of the element 20. Reinforcing strips 45 and 46 are provided in both instances, in order again to provide a frictional connection taking a portion of the shear load which would otherwise have to be carried entirely by the rivets 45 and 46. This transverse and generally normal relationship of the element 20 to the element 19 is advantageous aside from its primary purpose presently to be described. This additional advantage resides in the fact that the element 20 acts as a strut bracing the element 19.

In order to permit variation in the length given to the element 20, it is not constructed for attachment directly to the chassis frame structure, but is provided with attaching means generally designated 50. This means comprises a rigid main portion 51 rigidly secured at its end as by rivets 52 to the end of the element 20 and extending inwardly toward the element 19. Here reinforcing strips 53 are provided both on the outside of the element 20 and between the element 20 and the portion 51 to provide the usual frictional connection, and also in order that one of the reinforcing strips may serve to space the element 20 slightly from the main portion 51 of the attaching means, as best seen in Fig. 2. At its inner end the main portion 51 of the attaching means has a base or attaching flange 54 (see Fig. 1).

It is a feature of this invention to provide a stabilizer structure affording very great resistance to the undesirable relative movements between the body and the support therefor without stiffening the stabilizer structure in a material degree to flexing in the direction of permissible relative movement between the body and its support. It is also a feature of this invention to provide a stabilizer structure tending to resist body roll. As already stated, the stabilizer structure is of dual or duplex construction comprising a pair of stabilizers 17 and 18. Each stabilizer is disposed with its length longitudinally of the vehicle or body to be stabilized and with its width transversely of the vehicle with the two stabilizers in parallel side by side position in the same horizontal plane. The stabilizers are not placed immediately adjacent one another, but are spaced from one another so as to offer increased resistance to all body roll. The stabilizers are, of course, spaced equal distances from the longitudinal center line of the vehicle so as to provide a symmetrical construction.

In vehicles having a transverse spring 14 and inverted U-bolts 15 for securing the spring to the chassis frame structure, the U-bolts, of course, provide a logical point of attachment for the stabilizer structure to the chassis frame structure. The stabilizer structure, therefore, is arranged to have a common point of attachment utilizing the U-bolts 15. To that end, the attaching means 50 for the element 20 for both the stabilizer 17 and the stabilizer 18 are formed as an integral attaching means or bracket, generally designated 55, as best seen in Fig. 1. The bracket 55 has a main or upstanding flange 56 and a base or attaching flange 57, the ends of these flanges forming, respectively, the rigid main portions 51 and the base or attaching flanges 54 already described as comprising the attaching means for the elements 20 of the stabilizers 17 and 18. The elements 20 are secured to the portions 51 of the flange 56 in a manner already described, with the outer edges of the elements 20 flush with the end edges of the flange 56. The flange 57 at the center thereof, that is, intermediate the portions 54, is provided with a pair of apertures 58 for receiving the outer or forward leg of the pair of U-bolts 15 commonly provided. Flanking each aperture 58 are a pair of ribs or beads 59 extending transversely of the flange 57 and so spaced as to receive snugly therebetween the clip bar 16. With the beads 59 thus straddling the clip bars 16 and the nuts on the ends of the U-bolts screwed tightly into position, the bracket 55 is, of course, very rigidly secured, particularly against any movement in the plane of the flange 57. To provide added strength, the flange 56, as best seen in Fig. 2, is formed with a longitudinally extending offset 60 to afford increased resistance to bending of the bracket 55.

Though the actual attachment of the stabilizer structure is thus made to the chassis frame structure, at a common and already present point, the effective point of attachment of the elements 20 is one that may be varied to permit making the elements 20 of the desired and necessary length for the proper functioning of the stabilizer structure and of each stabilizer 17 and 18. As herein disclosed, the element 20 is substantially shorter than the element 19. Though the element 20 is shorter than the element 19, it should be and here is made of sufficient length to provide an effective free point in each stabilizer to compensate for the shortening and elongation of the distance between the point of attachment to the undercarriage and the point of attachment to the chassis frame structure during the flexing and recoil of the springs. Herein the element 20 is made enough longer than the main portion 51 of the attaching means so as to accommodate, without interference with the element 19, the ends of the U-bolts 15 that project below the clip bars 16.

With this construction, the stabilizers 17 and 18 will not contact the extending ends of the U-bolts 15 in any position of the spring 14 and may thus be employed in the dual stabilizer structure herein disclosed, or in a single stabilizer construction. It is pointed out at this time that, though the stabilizers 17 and 18 have here been shown as embodied in a dual or duplex stabilizer structure, they might equally well be employed alone, it being understood, of course, under those circumstances the apertures 58 would be shifted over so as to overlie the element 19 of the stabilizer.

The stabilizers as herein constructed permit of the extreme movements obtained with the present soft springs without stretching themselves or the structures to which they are attached excessively. The stabilizers also permit these extreme movements without materially reducing the road clearance. The positions which the stabilizers assume in the various positions of the spring 14 are shown in Figs. 3 to 5. The bracket 55 is, as previously stated, secured to the front leg of the U-bolts 15 with the elements 19 of the stabilizers extending rearwardly underneath and beyond the axle 10, so that the forwardly facing attaching means 21 may then be secured to the axle 10. The flange 25 being disposed at a slight angle with the horizontal, that is, directed upwardly from the horizontal, tends to direct the element 19 downwardly, causing it to remain clear of the rubber nub 37. The elements 19 being longer than the distance between their point of attachment to the securing means 21, when in position on the axle 10 and a point vertically below the attachment of the element 20 to the main portion 51, bows the element 20 outwardly away from the main portion 51 with the element 19 itself assuming a simple curve of very great radius. Thus it is readily seen, particularly from Fig. 3, that in this normal position of the spring 14 the stabilizer is not under any great stresses. Throughout the normal flexings and recoils of the spring 14, both the element 19 and the element 20 will continue to have the simple curves shown in Fig. 3. It will also be seen that during these normal flexings of the spring 14 the element 19 will lie in close proximity to the axle 10 so as not materially to reduce the road clearance.

It is possible, with the soft spring and low center of gravity construction employed today, that under extreme conditions the spring 14 may move downwardly to the position shown in Fig. 4. Though the spring thus has been flexed abnormally and to the extent that the chassis frame structure strikes the rubber bumpers on the axle, the stabilizer structure permits of this movement without undue stress to itself or the members to which it is attached. Under this condition, the element 20 is moved in a bit closer to the portion 51 so as to be flexed and thus stretched even less than in the normal position of the spring. The element 19 has taken on a compound curve, but with the radii of the curves still very large and thus still not presenting any sharp bends setting up high local stresses. It is also to be noted that the element 19 still clears the projecting ends of the U-bolts 15, but lies closely adjacent thereto so as not materially to reduce the road clearance over and above the extent to which it has already been reduced by the excessive flexing of the spring.

It is also possible that, with broken shock absorbers or improperly adjusted shock absorbers, the spring 14, after being flexed to the degree shown in Fig. 4, would recoil to the excessive extent shown in Fig. 5. However, even this abnormal condition does not injure the stabilizers, for under this condition the end of the element 20 attached to the element 19 moves inwardly to provide added length to the stabilizer. In addition, the element 19 assumes the compound curve shown in Fig. 5, with both the element 20 and element 19 under a tensional stress. Particularly is the element 19 at the point of attachment to the flange 25 under a tensional stress, with the axle 10 itself serving as the fulcrum about which the element 19 bends. This prevents the flange 25 from being pulled out of shape and still permits the element 19 to have gradual curves. Thus, in the abnormal recoiled position, the stresses set up in the stabilizer, though naturally increased over the stresses set up in normal operation of the spring, are nevertheless not so great as to injure the stabilizer.

With each stabilizer 17 and 18 so mounted as to resist longitudinal shift of the axle 10 relative to the chassis frame structure, that is, transversely thereof, the duplex stabilizer structure, of course, presents very high resistance to that undesirable relative movement. This is accomplished, however, without materially reducing the freedom of movement of the spring 14 vertically with respect to the axle 10, since the added effectiveness has been obtained without making the elements 19 more rigid. With the elements 19 so extremely flexible normal to their plane, they provide so little resistance to relative movement in this direction as to be immaterial even though a second stabilizer is employed.

An added advantage of this construction results from the location of the stabilizers 17 and 18 spaced laterally from the longitudinal center line of the vehicle. With any body roll of the vehicle, the chassis member 13 must, of course, be tilted with respect to the axle 10. Such tilting of the member 13 must of necessity tilt the bracket 55. Such tilting of the bracket 55, however, is resisted by the stabilizers 17 and 18, particularly the elements 19 thereof which are resistant to the twisting or distortion tending to result from this tilting of the bracket 55. With the stabilizers spaced laterally away from the center line of the vehicle and secured at the ends of the bracket 55, the stabilizers are very effective to prevent this tilting of the bracket 55 and consequently in preventing body roll, since the bracket acts as moment arms, first of all magnifying the extent of movement relative to the axle 10 resulting from the tilt of the member 13, thereby magnifying the extent of distortion of the elements 19 in order to permit such tilt. Secondly, the bracket 55 acts as moment arms multiplying the resisting force of the stabilizers to the tilting or body roll.

I claim as my invention:

1. A stabilizer structure for use with a vehicle having a chassis frame structure, an undercarriage structure and spring means interposed therebetween, comprising a pair of comparatively wide elements each highly resistant to bending moments in its plane and to twisting out of its plane, said elements being disposed flatwise longitudinally of the vehicle on opposite sides of the longitudinal center line of the vehicle, a second pair of comparatively wide elements each highly resistant to bending moments in its plane and to twisting out of its plane, one of said second pair of elements being associated with each of said first pair of elements, means rigidly connecting one end of said first pair of elements to the undercarriage structure, means rigidly connecting one end of said second pair of elements to the chassis frame structure, and means interconnecting the remaining ends of said pairs of elements providing a free point permitting movement of the chassis frame structure and the undercarriage structure toward and away from one another while retaining the resistance to bending in the plane or twisting out of the plane to prevent relative movement between the chassis frame structure and the undercarriage structure transversely of the vehicle and to resist roll of the chassis frame structure relative to the undercarriage structure.

2. A stabilizer structure for use with a vehicle having a chassis frame structure, an undercarriage structure and spring means interposed therebetween, comprising a pair of comparatively wide elements each highly resistant to bending moments in its plane and to twisting out of its plane but readily flexible in a direction normal to its plane, said elements being disposed flatwise longitudinally of the vehicle on opposite sides of the longitudinal center line of the vehicle, a second pair of comparatively wide elements each highly resistant to bending moments in its plane and to twisting out of its plane but readily flexible in a direction normal to its plane, one of said second pair of elements being rigidly secured at its end with one end of each of said first pair of elements, means rigidly connecting the remaining end of said first pair of elements to the undercarriage structure, and means rigidly connecting the remaining end of said second pair of elements to the chassis frame structure.

3. A stabilizer structure for use with a vehicle having a chassis frame structure, an undercarriage structure and spring means interposed therebetween, comprising a pair of comparatively wide elements each highly resistant to bending moments in its plane and to twisting out of its plane but readily flexible in a direction normal to its plane, said elements being disposed flatwise longitudinally of the vehicle on opposite sides of the longitudinal center line of the vehicle, a second pair of comparatively wide elements each highly resistant to bending moments in its plane and to twisting out of its plane but readily flexible in a direction normal to its plane, one of said second pair of elements being rigidly secured at its end with one end of each of said first pair of elements, the element of said second pair extending transversely of and generally normal to the element of said first pair to render the resultant unit more resistant to twisting, means rigidly connecting the remaining end of said first pair of elements to the undercarriage structure, and means rigidly connecting the remaining end of said second pair of elements to the chassis frame structure.

4. A stabilizer structure for use with a vehicle having a chassis frame structure, an undercarriage structure and spring means interposed therebetween, comprising a first nonload carrying means comprising a plurality of elements readily flexible in one direction but highly resistant to bending in a plane normal to the first direction, said elements being rigidly interconnected at one of their ends and rigidly connected at their remaining ends one to the chassis frame structure and one to the undercarriage structure, and a second nonload carrying means similar to said first means and also rigidly connected at its ends one to the chassis frame structure and one to the undercarriage structure, each of said means being disposed to resist relative movement between the chassis frame structure and the undercarriage structure in a direction transversely of the vehicle while interposing no restraint to movement of the chassis frame structure and the undercarriage structure toward and away from one another and positioned on opposite sides of the longitudinal center line of the vehicle spaced from the longitudinal center line of the vehicle.

5. A stabilizer structure for use with a vehicle having a chassis frame structure, an undercarriage structure and spring means interposed therebetween, comprising a first nonload carrying means comprising a plurality of elements rigidly interconnected at one of their ends and rigidly connected at the remaining ends one to the chassis frame structure and one to the undercarriage structure, said means extending generally longitudinally of the vehicle and operating to resist relative movement between the chassis frame structure and the undercarriage structure in a direction transversely of the vehicle and having a free point and extreme flexibility in a vertical direction permitting movement of the chassis frame structure and the undercarriage structure toward and away from one another, and a second means similar to said first means and also rigidly connected at its ends one to the chassis frame structure and one to the undercarriage structure, said means being disposed on opposite sides of the longitudinal center line of the vehicle.

6. A stabilizer structure for use with a vehicle having a chassis frame structure, an undercarriage structure and spring means interposed therebetween, comprising a pair of comparatively wide elements each highly resistant to bending moments in its plane and to twisting out of its plane, said elements being disposed flatwise longitudinally of the vehicle on opposite sides of the longitudinal center line of the vehicle, a second pair of comparatively wide elements each highly resistant to bending moments in its plane and to twisting out of its plane, one of said second pair of elements being associated with each of said first pair of elements, means rigidly connecting one end of said first pair of elements to the undercarriage structure, means rigidly connecting one end of said second pair of elements to the chassis frame structure, one of said means including a member common to both elements of one of the pairs of elements, and means interconnecting the remaining ends of said pairs of elements providing a free point permitting movement of the chassis frame structure and the undercarriage structure toward and away from one another while retaining the resistance to bending in the plane or twisting out of the plane to prevent relative movement between the chassis frame structure and the undercarriage structure transversely of the vehicle and to resist roll of the chassis frame structure relative to the undercarriage structure.

7. A stabilizer structure for use with a vehicle having a chassis frame structure, an undercarriage structure and spring means interposed therebetween, comprising a pair of comparatively wide elements each highly resistant to bending moments in its plane and to twisting out of its plane, said elements being disposed flatwise longitudinally of the vehicle on opposite sides of the longitudinal center line of the vehicle, a second pair of comparatively wide elements each highly resistant to bending moments in its plane and to twisting out of its plane, one of said second pair of elements being associated with each of said first pair of elements, means rigidly connecting one end of said first pair of elements to the undercarriage structure, means including a single integral member extending transversely of the vehicle rigidly secured to one end of each of said second pair of elements to form a common attachment of the elements to the chassis frame structure, and means interconnecting the remaining ends of said pairs of elements providing a free point permitting movement of the chassis frame structure and the undercarriage structure toward and away from one another while retaining the resistance to bending in the plane or twisting out of the plane to prevent relative movement between the chassis frame structure and the undercarriage structure transversely of the vehicle and to resist roll of the chassis frame structure relative to the undercarriage structure.

8. A stabilizer structure for use with a vehicle having a chassis frame structure, an undercarriage structure and spring means interposed therebetween, comprising a pair of comparatively wide elements each highly resistant to bending moments in its plane and to twisting out of its plane but readily flexible in a direction normal to its plane, said elements being disposed flatwise longitudinally of the vehicle on opposite sides of the longitudinal center line of the vehicle, a second pair of comparatively wide elements each highly resistant to bending moments in its plane and to twisting out of its plane but readily flexible in a direction normal to its plane, one of said second pair of elements being rigidly secured at its end with one end of each of said first pair of elements, the element of said second pair extending transversely of and generally normal to the element of said first pair to render the resultant unit more resistant to twisting, means rigidly connecting the remaining end of said first pair of elements to the undercarriage structure, and means rigidly connecting the remaining end of said second pair of elements to the chassis frame structure, said last mentioned means comprising a bracket member extending transversely of the vehicle across the elements and having a first flange rigidly secured at its outer edge to the remaining ends of said second pair of elements and extending inwardly therefrom, and a second flange having means formed therein for attachment to the chassis frame structure.

9. A stabilizer structure for use with a vehicle having a chassis frame structure, an undercarriage structure and spring means interposed therebetween, comprising a pair of units for giving lateral stability to a vehicle each including a plurality of leaf elements rigidly interconnected at one of their ends, each element being flexible normal to its plane and resistant to bending moments in its plane, one terminal element of each stabilizer unit being adapted for rigid connection at its remaining end to one of the structures of the vehicle spaced from the longitudinal center line of the vehicle and on a side of the vehicle opposite the point of attachment of the other stabilizer, and a single, common means rigidly secured to the remaining ends of the other terminal elements forming a common means for attaching the stabilizer structure to the remaining structure of the vehicle.

10. A stabilizer structure for use with a vehicle having a chassis frame structure, an undercarriage structure and spring means interposed therbetween, comprising a pair of stabilizer units each including a plurality of leaf elements rigidly interconnected at one of their ends, each element being flexible normal to its plane and resistant to bending moments in its plane, one terminal element of each stabilizer unit being adapted for rigid connection at its remaining end to the undercarriage structure spaced from the longitudinal center line of the vehicle and on a side of the vehicle opposite the point of attachment of the other stabilizer, and a single means rigidly secured to the remaining ends of the other terminal elements forming a common means for attaching the stabilizer structure to the chassis frame structure.

11. A stabilizer structure for use with a vehicle or other spring supported body comprising a pair of normally flat, comparatively wide elements disposed in the same plane in a side by side relationship, a second pair of elements each normally flat and comparatively wide, one element of said second pair being rigidly secured at one end of each of the elements of said first pair transversely of the element of the first pair and generally normal thereto, attaching means on the remaining ends of the elements of said first pair, and a single means rigidly secured to the remaining ends of said second elements forming a common attaching means for the second pair of elements.

12. A stabilizer structure for use with a vehicle or other spring supported body comprising a pair of normally flat, comparatively wide elements disposed in the same plane in a side by side relationship, a second pair of elements each normally flat and comparatively wide, one element of said second pair being rigidly secured at one end of each of the elements of said first pair transversely of the element of the first pair and generally normal thereto, attaching means on the remaining ends of the elements of said first pair, and a single integral attaching bracket member extending transversely across both elements of said second pair of elements, said bracket member having a first flange rigidly secured at its free edge to the remaining ends of the elements of said second pair and extending inwardly therefrom, and a second flange for attachment of the member.

13. A stabilizer structure for use with a vehicle or other spring supported body comprising a pair of normally flat, comparatively wide elements disposed in the same plane in a side by side relationship, a second pair of elements each normally flat and comparatively wide, one element of said second pair being rigidly secured at one end of each of the elements of said first pair transversely of the element of the first pair and generally normal thereto, a single member extending transversely across the elements rigidly secured to the remaining ends of the elements of one of said pairs of elements to form a common attaching means, and attaching means for the remaining pair of elements.

14. A stabilizer for use with a vehicle having a chassis frame structure, an undercarriage structure including an axle extending transversely and spring means interposed between the structures, comprising a first sheet element adapted in attached position of the stabilizer to be disposed flatwise and extending generally longitudinally of the vehicle underneath the axle, attaching means rigidly secured to one end of said element and extending inwardly from the end of the element for rigid attachment of the element to the undercarriage structure, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure providing an effective point of attachment of said second element different from the actual point of engagement with the chassis frame structure.

15. A stabilizer for use with a vehicle having a chassis frame structure, an undercarriage structure including an axle extending transversely and spring means interposed between the structures, comprising a first sheet element adapted in attached position of the stabilizer to be disposed flatwise and extending generally longitudinally of the vehicle underneath the axle, attaching means rigidly secured to one end of said element and extending inwardly from the end of the element for rigid attachment of the element to the undercarriage structure, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure, said attaching means extending inwardly from the end of said second element but terminating short of said first element to provide clearance between said first element and the chassis frame structure when the stabilizer is attached.

16. A stabilizer for use with a vehicle having a chassis frame structure, an undercarriage structure including an axle extending transversely and spring means interposed between the structures, comprising a first sheet element adapted in attached position of the stabilizer to be disposed flatwise and extending generally longitudinally of the vehicle underneath the axle, attaching means rigidly secured to one end of said element and extending inwardly from the end of the element for rigid attachment of the element to the undercarriage structure, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure comprising a rigid main portion extending inwardly from the end of said second element and generally parallel therewith, and an attaching flange on the inner end of the main portion.

17. A stabilizer comprising a first sheet element, attaching means rigidly secured at one end of said element and extending inwardly from the end of said element, a second sheet element rigid with the remaining end of said first element extending transversely thereof and disposed generally normal thereto, each of said elements being readily flexible in a direction normal to its plane but resisting bending moments in its plane, and attaching means at the remaining end of said second element comprising a rigid main portion secured to the remaining end of said second element and extending inwardly therefrom, and an attaching portion at the inner end of said main portion rigid therewith.

18. A stabilizer comprising a first wide and thin spring steel element, attaching means at one end of said element including a jaw forming member rigidly secured to the end of said element and extending inwardly therefrom to position the jaw of the member inwardly of its point of attachment to the element, a separate second wide and thin spring steel element extending transversely of said first element at the remaining end thereof and disposed generally normal thereto, an angle bar rigidly interconnecting said elements, and attaching means at the remaining end of said second element comprising a rigid main portion secured to the remaining end of said second element and extending inwardly therefrom, and an attaching flange on the inner end of said main portion.

EDWIN BAGNALL.